United States Patent [19]

Siner

[11] Patent Number: 5,762,439
[45] Date of Patent: Jun. 9, 1998

[54] SERVO-MEMBER AND METHOD OF MAKING

[76] Inventor: Irwin H Siner, 201 S. Third St., Coopersburg, Pa. 18036

[21] Appl. No.: 774,133

[22] Filed: Dec. 26, 1996

[51] Int. Cl.⁶ .................................... F16B 11/00
[52] U.S. Cl. ................... 403/359; 403/258; 403/274; 29/525
[58] Field of Search ................ 403/359, 298, 403/260, 258, 256, 274, 282; 29/889.6, 889, 525; 74/89.22, 96, 522

[56] References Cited

U.S. PATENT DOCUMENTS

| | | | |
|---|---|---|---|
| 1,990,990 | 2/1935 | Hathorn | 403/359 X |
| 2,510,414 | 6/1950 | Philbrick | 403/359 X |
| 2,596,795 | 5/1952 | Schulze | 403/258 X |
| 2,838,329 | 6/1958 | Pressley | 403/359 X |
| 3,588,154 | 6/1971 | Voight et al. | 403/359 X |
| 3,608,936 | 9/1971 | Karden | 403/359 X |
| 3,965,528 | 6/1976 | Kissler | 403/359 X |
| 4,226,454 | 10/1980 | Tranberg et al. | 403/359 X |
| 4,411,549 | 10/1983 | Sheppard | 403/260 X |
| 4,778,303 | 10/1988 | Mullins | 403/260 X |
| 4,881,842 | 11/1989 | Farrell et al. | 403/359 X |
| 4,886,392 | 12/1989 | Iio | 29/525 X |
| 5,304,012 | 4/1994 | Wendling | 403/274 |
| 5,492,024 | 2/1996 | Siner | 74/89.22 |

FOREIGN PATENT DOCUMENTS

| | | | |
|---|---|---|---|
| 821290 | 11/1951 | Germany | 403/359 |
| 476881 | 12/1937 | United Kingdom | 403/258 |

Primary Examiner—Harry C. Kim
Attorney, Agent, or Firm—Haynes and Boone, L.L.P.; James R. Bell

[57] ABSTRACT

A servo-member includes a rigid body having first and second opposed planar surfaces. A hub is formed on the first surface. A first keyed bore is formed in the hub and terminates at an annular seat. The first bore has a first diameter. A recessed circumferential groove is formed in the first bore adjacent the seat. The groove has a second diameter which is greater than the first diameter. A counterbore is formed in the second surface. The counterbore is separated from the first bore by the annular seat. The seat includes an opening which passes through the seat and interconnects the first bore and the counterbore.

9 Claims, 4 Drawing Sheets

SERVO-MEMBER AND METHOD OF MAKING

FIELD OF THE INVENTION

This invention relates generally to a servo-wheel and more particularly to a wheel for coupling to a servo-motor for transferring control motion from the motor to control members and a method of making the wheel.

BACKGROUND OF THE INVENTION

The use of a wheel or arm member coupled to a servo-motor for transferring control motion from the servo-motor to control members is well known. In the past, servo-wheels were formed of a synthetic material such as a plastic or the like. These wheels are coupled to either cables or metal control rods and also to servo-output shafts.

During controlled maneuvers of powered model aircraft, for example, these wheels are subjected to high stresses, often suddenly applied, and often rapidly repeated in reversed directions. As a result, a great deal of flex and wear, and sometimes failure, is imposed on the plastic part. This wear is cumulative, and over time the plastic wheel to metal control rod coupling becomes loose, creating slop or lost motion between the output shaft of the servo-motor and the control rods connected to the servo-wheel.

One attempt to overcome the limitations of the plastic servo-wheel was to provide a wheel in the form of a rigid metal disc. A hub at the center of the disc has a through bore broached for keyed connection to the servo-motor spline. The broaching step for cutting the keys in the hub could only be accomplished by drawing the broach through the bore in the conventional manner. As a result, an insert was required to provide a seat for the bore and provide means for a screw connection to the servo-motor shaft. The required insert adds manufacturing and material cost to the production of the wheel. Therefore, it would be advantageous to provide a metal servo-wheel which is of simple construction and requires less cost to produce.

The foregoing illustrates limitations of the known prior art. Thus, it is apparent that it would be advantageous to provide a servo-wheel and improved method of making the wheel which overcomes the limitations set forth above. Accordingly, a suitable alternative is provided including features and benefits more fully disclosed hereinafter.

SUMMARY OF THE INVENTION

In one aspect of the present invention, this is accomplished by providing a servo-member comprising a rigid body having first and second opposed planar surfaces. A hub is formed on the first surface. A first keyed bore is in the hub and terminates at an annular seat, the first bore having a first diameter. A recessed circumferential groove is formed in the first bore adjacent the seat. The groove has a second diameter, which is greater than the first diameter. A counterbore is formed in the second surface. The counterbore is separated from the first bore by the annular seat. The seat includes an opening which passes therethrough and interconnects the first bore and the counterbore.

Forming the groove in the bore in this manner permits the servo-member to be formed using a broach that can be pressed into a blind bore rather than through a bore. As a result, the splines can be formed in a bore having a closed or blind end due to the presence of the undercut groove formed adjacent the bore seat. The foregoing and other aspects will become apparent from the following detailed description of the invention when considered in conjunction with the accompanying drawing figures. It is to be expressly understood, however, that the figures are not intended as a definition of the invention, but are for the purpose of illustration only.

DETAILED DESCRIPTION OF THE INVENTION

Figure 1:
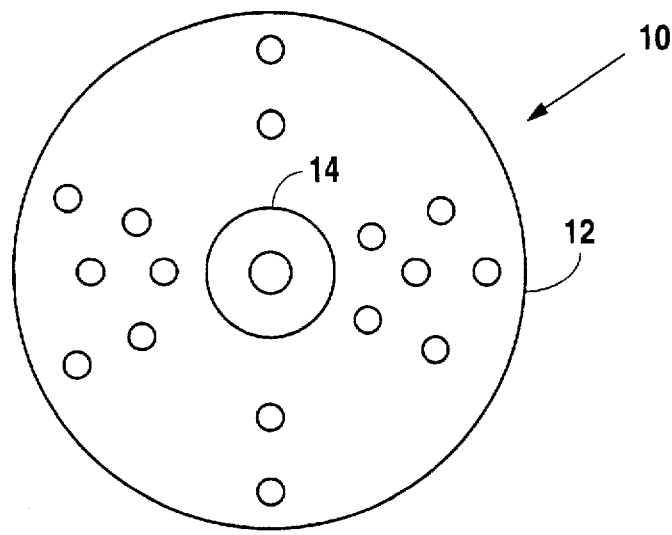
FIG. 1 is a planar view illustrating an embodiment of a servo-member.

Referring to the drawings, a servo-member 10 comprises a rigid body preferably formed of a light weight metal such as aluminum. The servo-member 10 can be in the form of a rigid disc 12, FIG. 1, having a hub 14 formed in the geometric center. Member 10 can also be in the form of a single rigid arm 16, FIG. 2, extending radially outwardly from hub 14a, or may include a pair of rigid arms 16a, 16b extending radially outwardly from hub 14b so that arms 16a, 16b are diametrically opposed relative to each other.

Figure 4:
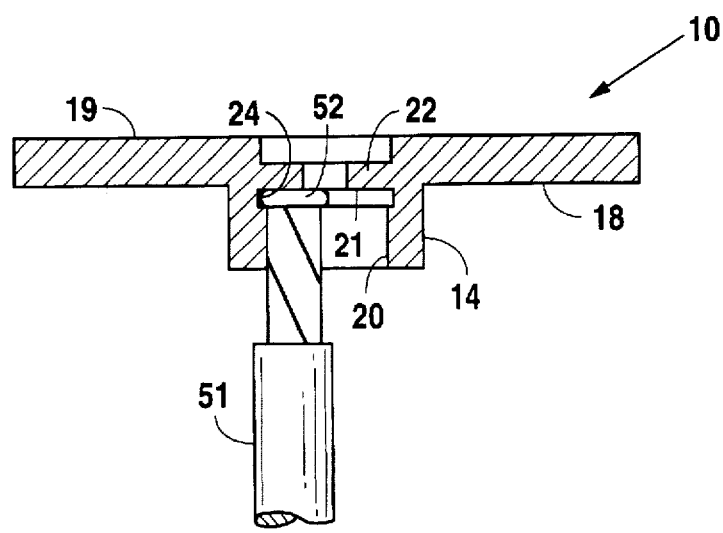
FIG. 4 is a cross-sectional view illustrating an embodiment of a groove being formed in a bore.
Figure 7:
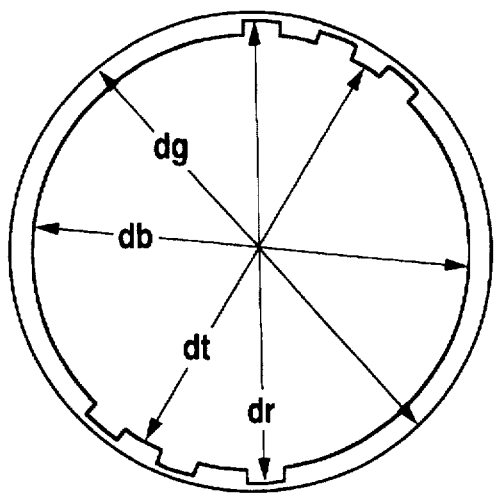
FIG. 7 is a diagrammatic view illustrating an embodiment of diametrical relationships.

Servo-member 10, FIG. 4, includes a first planar surface 18 and a second opposed planar surface 19. Hub 14 is formed on first surface 18. A first bore 20 is formed in hub 14. First bore 20 includes a first diameter designated db in FIG. 7. First bore 20 terminates at a surface 21 of an annular seat 22, FIG. 4. A recessed annular groove 24 is circumferentially undercut at an end of bore 20 adjacent seat 22. Groove 24 has a second diameter designated dg in FIG. 7. Second diameter dg is greater than the diameter db of bore 20.

Figure 5:
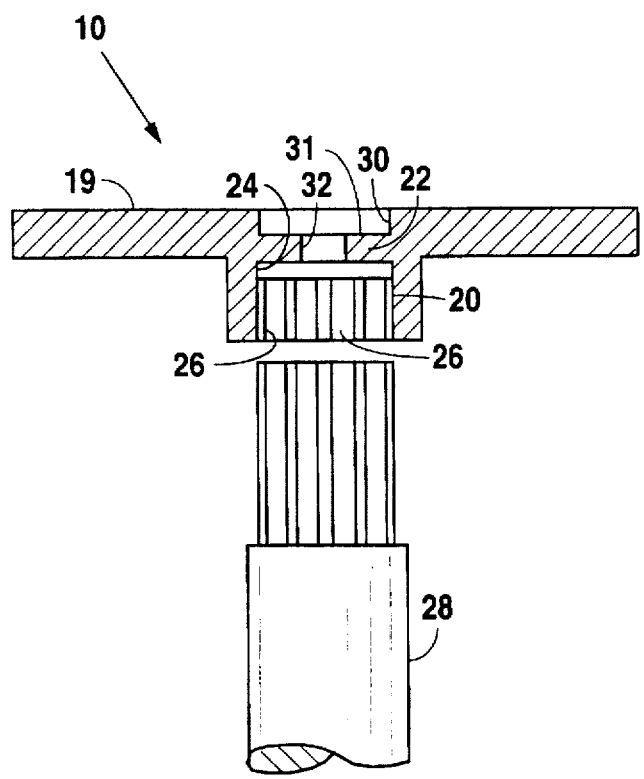
FIG. 5 is a cross-sectional view illustrating an embodiment of a broach forming splines in a bore.

Bore 20 is then keyed by having a plurality of splines 26 formed therein, FIG. 5. This is accomplished by pressing or forcing a broach 28 into bore 20. Due to the presence of undercut groove 24, the metal pieces cut from bore 20 by broach 28 are released from the bore 20 when the broach 28 cuts through to groove 24. The depth or root diameter designated dr in FIG. 7, of splines 26 is the same as or slightly less than groove diameter dg. In this manner, when broach 28 cuts through to groove 24, the metal pieces cut by broach 28, are free to break away from bore 20. Splines 26 have a tooth diameter, designated dt in FIG. 7, that is substantially the same as bore diameter db.

A counterbore 30, FIG. 5, is formed in second planar surface 19 and is coaxially aligned with first bore 20. Counterbore 30 terminates at a surface 31 of annular seat 22. Thus, seat 22 separates bore 20 and counterbore 30. An opening 32 is formed through seat 22 to interconnect bore 20 and counterbore 30. Opening 32 is of a diameter or size sufficient to permit a screw to pass through as will be discussed later.

Figure 2:
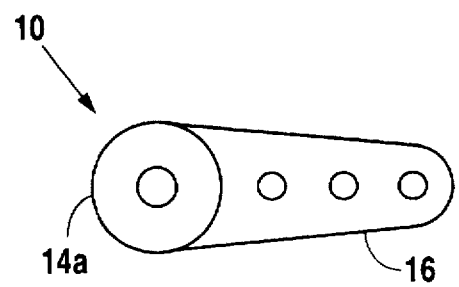
FIG. 2 is a planar view illustrating another embodiment of a servo-member.
Figure 3:
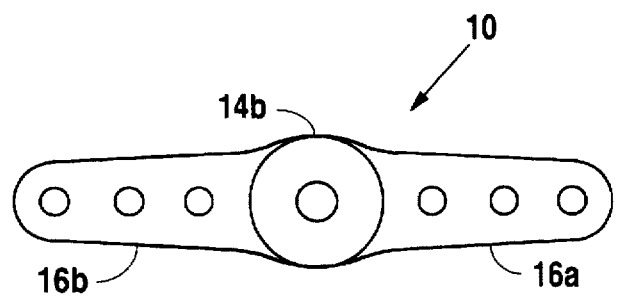
FIG. 3 is a planar view illustrating another embodiment of a servo-member.
Figure 6:
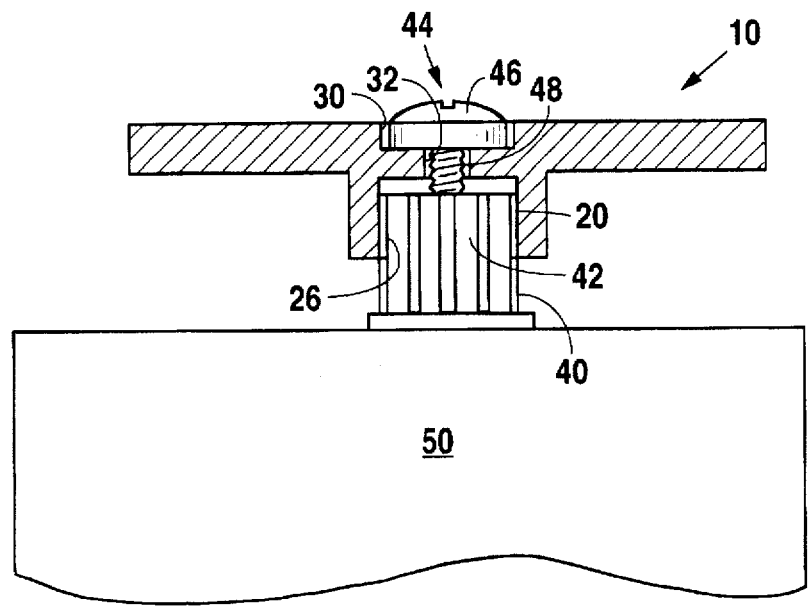
FIG. 6 is a cross-sectional view illustrating an embodiment of a servo-motor shaft connected to a servo-member.

Servo-member 10 may be formed on a lathe or by a milling process so that any desired shape may be accomplished, such as the disc 12, FIG. 1, single arm 16, FIG. 2, or pair of arms 16a, 16b, FIG. 3. A commercially available servo-motor 50 includes a plastic rotatable output shaft 40, FIG. 6, including a male spline end 42 which is received by female splines 26 of servo-member 10. Shaft 40 is self-tapping to receive a threaded fastener 44 which has a head 46 seated in counterbore 30 and a shaft 48 extending through opening 32.

Figure 8:
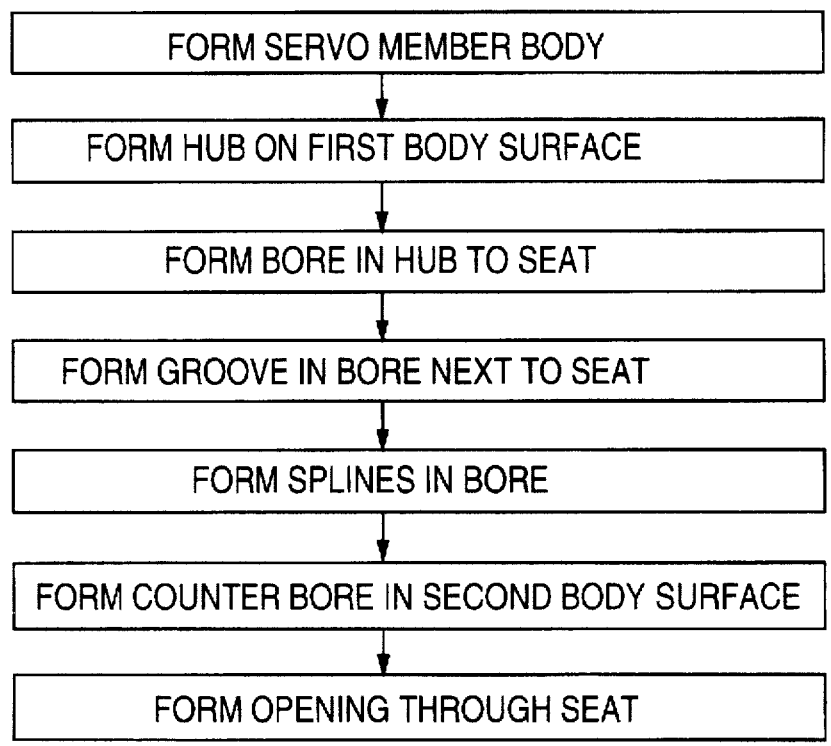
FIG. 8 is a block diagram illustrating steps in a method of forming a servo-member.

Servo-member 10 is formed, FIG. 8, as a rigid body, preferably from aluminum stock. A hub 14 is formed on surface 18 of member 10. Bore 20 is formed in hub 14 by an end mill or by other suitable cutting tools. A custom mill 51, FIG. 4, includes a cutting end 52 used to form groove 24 as an undercut adjacent seat 22. Groove 24 has a diameter greater than the diameter of bore 20. A broach 28 can be pressed into bore 20 to form splines 26 without passing broach 28 through the bore due to the presence of groove 24. Advantageously, groove 24 permits use of broach 28 without the need to pass through member 10. This is possible, since metal cut away from bore 20 breaks free when broach 28 enters groove 24. The metal is released from splines 26 into groove 24. Counterbore 30 is formed in surface 19 of member 10 by an end mill or on a lathe and an opening 32 is formed through seat 22 to interconnect bore 20 and counterbore 30. The entire member 10 is formed by various machining operations.

While this invention has been illustrated and described in accordance with a preferred embodiment, it is recognized that variations and changes may be made therein without departing from the invention as set forth in the claims.

Having described the invention, what is claimed is:

1. A servo-member comprising:

a rigid body having first and second opposed planar surfaces;

a hub formed on the first surface;

a first bore in the hub, the first bore having a first diameter including a splined portion terminating adjacent an annular seat;

a recessed circumferential groove formed between the splined portion and the seat, the groove having a second diameter greater than the first diameter to permit cuttings from forming splines of the splined portion to break away from the first bore and enter the groove; and a counterbore formed in the second surface, the counterbore being separated from the first bore by the annular seat, the seat having an opening formed therethrough interconnecting the first bore and the counterbore.

2. The servo-member as defined in claim 1, wherein the first bore is keyed with spline.

3. The servo-member as defined in claim 2, wherein the body includes an arm extending radially outwardly from the hub.

4. The servo-member as defined in claim 2, wherein the body includes a pair of arms extending radially outwardly from the hub, one of the arms being diametrically opposed with the other arm.

5. The servo-member as defined in claim 2, wherein the body is disc-shaped and the hub is in the geometric center of the disc.

6. The servo-member as defined in claim 2, wherein the body is formed by a milling process.

7. The servo-member as defined in claim 2, wherein the body is formed of aluminum.

8. A servo-member comprising:

a rigid body having first and second opposed planar surfaces;

a hub formed on the first surface;

a first bore formed in the hub, the first bore having a first diameter including a splined portion terminating adjacent an annular seat;

a recessed circumferential groove formed between the splined portion and the seat, the groove having a second diameter greater than the first diameter;

a plurality of splines in the splined portion of the first bore, the splines having a tip diameter and a root diameter;

the second diameter of the groove being sufficiently greater than the root diameter to permit cuttings from forming the splines to break away from the first bore and enter the groove; and a counterbore formed in the second surface, the counterbore being separated from the first bore by the annular seat, the seat having an opening formed therethrough interconnecting the first bore and the counterbore.

9. A method of forming a servo-member comprising the steps of:

forming a servo-member body from a rigid material;

forming a hub on a first surface of the body;

forming a first bore of a first diameter in the hub, and terminating the first bore adjacent an annular seat;

forming an annular groove in the first bore adjacent the annular seat, so that the groove has a second diameter greater than the first diameter;

forming a plurality of splines with a tip diameter and a root diameter on an interior circumferential surface of the first bore so that the groove is between the splines and the seat and so that the second diameter of the groove is sufficiently greater than the root diameter to permit cuttings from forming the splines to break away from the first bore and enter the groove;

forming a counterbore in a second surface of the body so that the seat separates the counterbore from the first bore; and forming an opening through the seat for interconnecting the first bore with the counterbore.

* * * * *